United States Patent [19]

Ashiba

[11] Patent Number: 4,997,068

[45] Date of Patent: Mar. 5, 1991

[54] HYDRAULIC DAMPER OF ADJUSTABLE DAMPING FORCE TYPE

[75] Inventor: Masahiro Ashiba, Kanagawa, Japan

[73] Assignee: Tokico Ltd., Kanagawa, Japan

[21] Appl. No.: 361,866

[22] Filed: Jun. 6, 1989

[30] Foreign Application Priority Data

Jun. 7, 1988 [JP] Japan .................................. 63-140279
Jun. 7, 1988 [JP] Japan .................................. 63-140280

[51] Int. Cl.$^5$ ............................................. F16F 9/44
[52] U.S. Cl. ........................................ 188/319; 188/282; 188/285; 188/299
[58] Field of Search ................ 188/299, 319, 280, 282, 188/285, 322.15, 288

[56] References Cited

U.S. PATENT DOCUMENTS

| | | | |
|---|---|---|---|
| 4,085,667 | 4/1978 | Kurrat | 188/285 X |
| 4,535,877 | 8/1985 | Shimokura | 188/319 |
| 4,620,619 | 11/1986 | Emura et al. | 188/282 |
| 4,723,640 | 2/1988 | Beck | 188/319 |
| 4,754,855 | 7/1988 | Kuwana et al. | 188/299 |
| 4,765,446 | 8/1988 | Murata et al. | 188/319 |
| 4,826,207 | 5/1989 | Yoshioka et al. | 188/319 |

FOREIGN PATENT DOCUMENTS

| | | |
|---|---|---|
| 58-81242 | 5/1983 | Japan . |
| 58-84241 | 5/1983 | Japan . |
| 59-11932 | 1/1984 | Japan . |
| 61-190048 | 11/1986 | Japan . |
| 62-27726 | 7/1987 | Japan . |
| 2126687 | 3/1984 | United Kingdom . |

Primary Examiner—Matthew C. Graham
Attorney, Agent, or Firm—Wenderoth, Lind & Ponack

[57] ABSTRACT

A hydraulic damper for use in a vehicle capable of adjusting a damping force in accordance with road conditions. The hydraulic damper includes a cylinder chamber divided into two chambers by a piston, a bypass passage formed in the piston for communicating the two chambers, a plurality of damping force generation valves adaped to generate the damping forces in the extension side and the contraction side strokes, and a shutter for controlling the flow passage area of the bypass passage. Rotation of the shutter permits selective switching of the damping force generation valves to provide various kinds of damping force characteristics as suitable for the road condition.

4 Claims, 9 Drawing Sheets

HYDRAULIC DAMPER OF ADJUSTABLE DAMPING FORCE TYPE

TECHNICAL FIELD

The present invention relates to a hydraulic damper for use in a vehicle or the like which is capable of adjusting the damping force in accordance with the condition of the road surface over which the vehicle is running.

BACKGROUND OF THE INVENTION

Various types of hydraulic dampers for use in automobiles or the like have been proposed, such as dampers capable of adjusting the damping force to match the condition of the road surface over which the automobile is running, in order to enhance the level of comfort and maneuverability of the automobile.

An example of this hydraulic damper of adjustable damping force type is disclosed in Japanese Utility Model Publication No. SHO-62-27726.

According to this hydraulic damper, the cylinder is divided into two chambers by a piston, and the differential pressure generated by movement of the piston in the cylinder by extension and contraction of the piston rod causes a first damping force generation valve to be opened or closed so as to generate the damping forces in the extension and contraction strokes.

While a bypass passage in communication with the two chambers is provided in the piston rod and is branched through a pipe into two passage routes internally and externally of the pipe, a second damping force generation valve is provided in the passage route on the exterior of the pipe so as to generate the damping forces in the extension and contraction strokes. This passage route is designed to be selectively opened or closed by a shutter which can be operated from the outside to allow the damping force to be changed.

In the other passage route running through the pipe, orifices disposed in two stages and in communication with the two cylinder chambers are provided, and a desired orifice may be selected by operating the shutter. A check valve is provided between the orifices in the two stages, and the check valve causes the orifice of the lower stage only to communicate with the two chambers in the extension stroke so as to control the flow passage area of this passage route.

Opening and closing of the first mentioned one passage route and control of the flow passage area of the other passage route allows the damping force to be adjusted to different levels.

There are, however, two problems with regard to the hydraulic dampers of the type described above, as summarized below.

Firstly, since the check valve is inserted in the shutter, assembly of the check valve is not easy, resulting in an inefficient assembly operation in the manufacturing process.

Further, since adjustment of the damping force is executed only through the orifice, this adjustment can only be executed in the low speed range of the piston rod operating speed, so that the damping force cannot be changed in the high speed range of the piston rod. Consequently, it is difficult to adequately adjust the damping force to match the condition of the road surface over which the vehicle is running.

Another type of conventional adjustable damping force type hydraulic damper is disclosed in Japanese Utility Model Public Disclosure No. SHO-61-190048.

In this hydraulic damper, a piston rod extends into the cylinder in coaxial relation with a piston slidably disposed in the cylinder and partitioning the interior of the cylinder into upper and lower chambers. On the end that is inserted into the cylinder is mounted a tubular member provided with a plurality of orifices which have different opening areas. A bypass passage is defined by a through bore formed in the piston rod and adapted to allow insertion of an operating rod for operating the shutter to selectively open and close the orifices. By operating this rod, the orifices can be selected as required to control the flow of the oil flowing through the bypass passage, thereby adjusting the damping force to be generated.

In the conventional hydraulic damper mentioned above, the bypass passage for adjustment of the damping force is defined between the inner circumference of the through bore of the piston rod and the outer circumference of the operating rod, resulting in the passage having a small area. Especially in a hydraulic damper with a piston rod having a relatively small diameter, it is impossible to make the area of the passage sufficiently large without sacrificing the strength of the piston rod to an unacceptable extent.

In these circumstances, the narrow passage causes the resistance to the oil flow to generate a large damping force. Hence, even if orifices are made relatively large in order to obtain a low damping force characteristic, the damping force cannot be suitable reduced because of the resistance of the passage, thereby making the desired adjustment of the damping force impossible. Especially in the case where a valve mechanism is provided in the bypass passage, it is desirable for the bypass passage to have a large area for oil flow in order that the valve mechanism may create no disturbance to the flow control.

The present invention has been proposed in consideration of the problems explained above with reference to the prior art and has as its object the provision of a hydraulic damper of the adjustable damping force type which offers a simpler assembly operation and is capable of adjusting damping forces not only in the low speed range of a piston rod but also in the high speed range thereof.

It is another object of the present invention to provide a hydraulic damper in which the oil passage for adjusting the damping force has a large area so that suitable adjustment of the damping force can be consistently accomplished.

SUMMARY OF THE INVENTION

In order to solve the first problem pointed out above, a hydraulic damper according to the present invention is so constituted that the interior of a cylinder is divided into two chambers by a piston that slidably fits in the cylinder, the piston being provided with a first passage formed therein in communication with the two chambers and a first damping force generation valve mounted thereon and adapted to generate an extension side damping force and a contraction side damping force. A bypass passage in communication with the two chambers is provided in the piston, and a shutter is adapted to adjust the flow passage area of the bypass passage provided in the bypass passage. An annular member has a second passage allowing the opposite sides of the annular member to communicate with each other and is fitted in the bypass passage. A second damping force generation valve adapted to generate extension side and contraction side damping forces is mounted on the opposite sides of the annular member by means of a stud inserted into the annular member and a tightening member screwed on the stud. A through-hole is formed axially through the stud, and a valve mechanism adapted to control flow of the hydraulic fluid in the through-hole is provided in the stud.

In order to solve the second problem pointed out above, the hydraulic damper of the present invention constituted in the manner mentioned above is further characterized in that the shutter is designed to selectively switch the flow route in the bypass passage between the route having the second damping force generation valve and the route having the valve mechanism for controlling the passage area of the bypass passage, thereby enabling the valve mechanism to function as a third damping force generation valve adapted to generate damping forces in the extension side stroke as well as in the contraction side stroke.

According to the inventive constitution explained above, the bypass passage in the piston is branched to form one passage route in which the damping force is generated by the second damping force generation valve and another passage route in which the fluid in the through-hole of the stud is controlled by the valve mechanism, while the valve mechanism that is adapted to control the fluid is provided not on the shutter, but on the stud carrying the second damping force generation valve. Assembly of the valve mechanism is thus made easier.

Further, in the case where the first, second and third damping force generation valves are selected by operating the shutter, various kinds of different damping force characteristics can be obtained by designing the damping force generating valves to have different damping force characteristics and by suitably selecting and combining those valves.

In one embodiment, the one end of the piston rod inserted into the cylinder is provided with a tubular member mounted thereon which has an outer diameter greater than the outer diameter of the piston rod through which the operating rod is inserted, and the piston is mounted on the outer periphery of the tubular member to divide the interior of the cylinder into two chambers. A bypass passage providing communication between the two chambers is defined by the interior of the tubular member and a hole formed in the tubular member.

In this embodiment, a passage (bypass passage) is formed for controlling the flow of oil therethrough so as to adjust the damping force, not by utilizing a space between the through bore of the piston rod and the operating rod, but by utilizing the interior of the tubular member having a large outer diameter. The inner diameter of the tubular member can therefore be made large so that the passage will cause no resistance against the oil flowing therethrough, thereby enabling the generation of low damping force. Thus, adequate adjustment of the damping force can be accomplished.

BRIEF DESCRIPTION OF THE DRAWINGS

The present invention will be further described by way of embodiments with reference to the accompanying drawings, wherein like reference numerals refer to like parts in the several views, and wherein.

DESCRIPTION OF THE EMBODIMENTS

Figure 1:
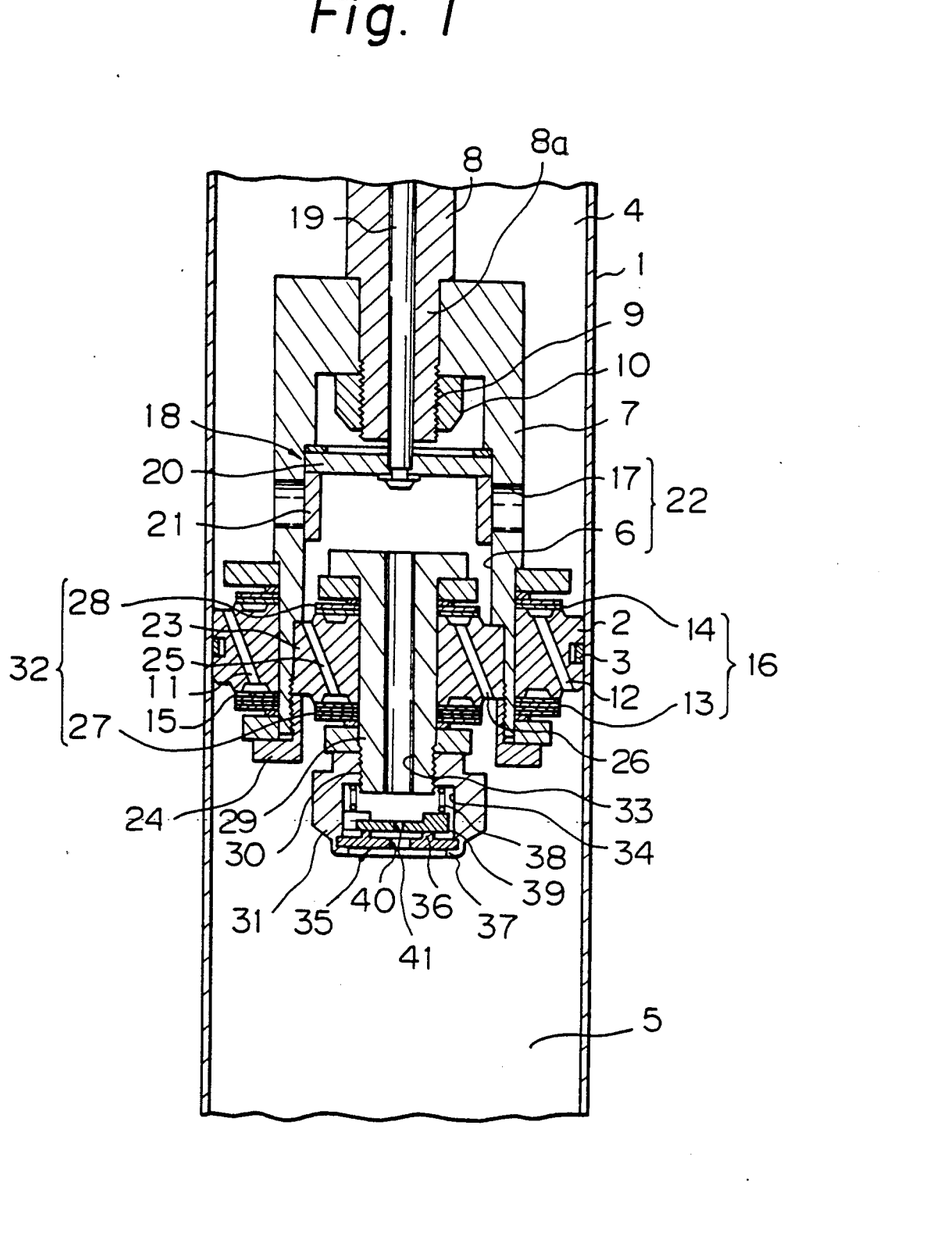
FIG. 1 is a sectional view of the essential part of a hydraulic damper of the adjustable damping force type according to a first embodiment of the present invention.

Reference will first be made to FIG. 1 to explain the constitution of a first embodiment of the present invention. Numeral 1 designates an inner cylinder of a dual type cylinder disposed coaxially with an outer cylinder which is not shown. In the cylinder is disposed a piston 2 which divides the interior of the cylinder into two chambers and which slidably fits in the cylinder through a piston ring 3. It is to be understood that the chamber shown in the upper part of FIG. 1 will be hereinafter referred to as the upper cylinder chamber 4 while the one in the lower part will be hereinafter referred to as the lower cylinder chamber 5.

The piston 2 is attached to the outer circumference of a cylindrical member 7 having a stepped bore 6 with a larger diameter portion and a smaller diameter portion. The cylindrical member 7 is in turn integrally secured to a piston rod 8 in such a manner that a threaded portion 9 provided at an end portion of the piston rod 8 is inserted into the smaller diameter portion of said stepped bore 6 through a hole formed in the top of the cylindrical member 7 and a nut 10 is screwed onto the threaded portion 9 positioned inside the cylindrical member 7.

In the piston 2 are provided an extension side passage 11 and a contraction side passage 12 which define together a first passage providing communication between the upper cylinder chamber 4 and the lower cylinder chamber 5. Disc valves 13 and 14, which are caused to open by the differential pressure between the upper cylinder chamber 4 and the lower cylinder chamber 5 are disposed on opposite sides of the piston 2. The disc valve 13 of one part (the lower part in FIG. 1) is caused to open by virtue of the differential pressure generated by the pressure in the upper cylinder chamber 4 becoming higher than the pressure in the lower cylinder chamber 5, thereby allowing the hydraulic fluid to flow through the extension side passage 11 from the upper cylinder chamber 4 to the lower cylinder chamber 5. On the other hand, the disc valve 14 of the other part (or the upper part in FIG. 1) is caused to open by virtue of the differential pressure caused by the pressure in the lower cylinder chamber 5 becoming higher than that of the upper cylinder chamber 4, thereby allowing the hydraulic fluid to flow through the passage 12 from the lower cylinder chamber 5 to the upper cylinder chamber 4.

The disc valve 13 of one part is set to open when the difference in pressure between the upper cylinder chamber 4 and the lower cylinder chamber 5 becomes $P_A$ while the disc valve 14 of the other part is set to open at a differential pressure $P_a$, which is lower than the differential pressure $P_A$. A fixed orifice 15 comprising a cutout portion is formed in the disc valve 13 of the one part. It is to be understood that both of these disc valves 13 and 14, constitute together a first damping force generation valve 16.

In the cylindrical member 7 is formed a hole 17 which provides communication between the upper cylinder chamber 4 and the interior of the cylindrical member 7. On the inner circumference of the cylindrical member 7 is disposed a shutter 18 for selectively opening and closing the communication hole 17. The shutter 18 consists of an operating rod 19 which extends axially through the piston rod 8, and one end of which projects outwardly. A rotary member 20 is attached to the other end of the operating rod 19 and a pair of sector-shaped closure members 21 attached to the rotary member 20 and are so formed as to extend along the inner periphery of the cylindrical member 7. The shutter 18 is adapted to open or close the hole 17 by rotating the operating rod 19.

It is to be noted that the hole 17 and the stepped bore 6 in the cylindrical member 7 constitute a bypass passage 22 which provides communication between the upper cylinder chamber 4 and the lower cylinder chamber 5, and the flow passage area of the bypass passage 22 can be controlled by means of the shutter 18.

It is also to be noted that the outer diameter of the cylindrical member 7 is substantially greater than that of the piston rod 8, and thus the inner diameter of the stepped bore 6 can be made greater than the outer diameter of a portion 8a of the piston rod 8 on which the cylindrical member 7 is mounted, so that the area of the bypass passage 22 can be made considerably large.

An annular member 23 is arranged to fit in the bypass passage 22 and is fixedly secured to the member 7 by means of a stop member 24 screwed onto the end of the cylindrical member 7. The annular member 23 is formed with an extension side passage 25 and a contraction side passage 26, both passages together constituting a second passage which provides communication between the opposite sides of the annular member 23. On the opposite sides of the annular member, there are disposed disc valves 27 and 28 which are respectively adapted to be opened by virtue of the differential pressure between the interior of the cylindrical member 7 and the lower cylinder chamber 5.

In the case where the upper cylinder chamber 4 and the bypass passage 22 are in communication with each other, the pressure in the interior of the cylindrical member 7 becomes higher than the pressure in the lower cylinder chamber 5 in the extension stroke of the piston, and the disc valve 27 of one part (or the disc valve shown at the lower portion as viewed in FIG. 1) is caused to open so that the hydraulic fluid may be allowed to flow from the bypass passage 22 to the lower cylinder chamber 5 through the extension side passage 25. On the contrary, the disc valve 28 of another part (or the disc valve shown at the upper portion as viewed in FIG. 1) is caused to open when the pressure in the lower cylinder chamber 5 becomes higher than the pressure in the interior of the cylindrical member 7 in the contraction stroke of the piston so that the hydraulic fluid may be allowed to flow from the lower cylinder chamber 5 to the bypass passage 22 through the contraction side passage 26. It is to be noted that the disc valve 27 of one part is set to open when the differential pressure is $P_B$ and the disc valve 28 of another part is set to open when the differential pressure is $P_b$, which is a lower value than $P_B$.

These disc valves 27 and 28 are sandwiched by a head portion of a stud 29 extending axially of the annular member 23 and a tightening member 31 screwed onto a threaded portion 30 of the stud 29 and respectively held on the opposite sides of the annular member 23. These disc valves 27 and 28 together constitute a second damping force generation valve 32.

It is to be noted that the respective disc valves 27 and 28 constituting the second damping force generation valve 32 are set to be opened at differential pressures which are respectively lower than the differential pressures which cause the respective disc valves 13 and 14 constituting the first damping force generation valve 16 to be opened ($P_A > P_B$, $P_a > P_b$).

A through-hole 33 is formed axially through the stud 29, and the through-hole 33 and a bore 34 defined in the interior of the tightening member 31 together allow communication between the interior of the cylindrical member 7 and the lower cylinder chamber 5. A valve mechanism 35 which serves as a check valve is provided in the bore 34 inside the tightening member 31. The valve mechanism 35 constitutes a valve seat member 37 on which a valve seat 36 is formed and a valve body 39 which is pressed against the valve seat 36 by a coil spring 38. On the valve seat member 37 is formed an orifice 40 which establishes contraction side orifice characteristics as will be explained later, while the valve member 39 is provided with an orifice 41 which establishes extension side orifice characteristics. It is to be noted that the orifice 40 has a larger opening area than the orifice 41.

The operation of the hydraulic damper of adjustable damping force type with the constitution described above will next be explained.

When the bore 17 is closed by the shutter 18 upon rotation of the operating rod 19, since the hydraulic fluid will not flow through the bypass passage 22, damping force will only be generated by the first damping force generation valve 16. In this case, while the operation speed of the piston 2 is slow and the differences in pressures between the two cylinder chambers in the extension stroke and the contraction stroke of the piston remain respectively lower than $P_A$ and $P_a$, the disc valves 13 and 14 constituting the first damping force generation valve 16 will not be opened, and damping force will only be generated by the fixed orifice 15, providing orifice characteristics like the quadratic curve indicated by the lines $L_{A1}$ and $L_{a1}$ in FIG. 6.

Figure 6:
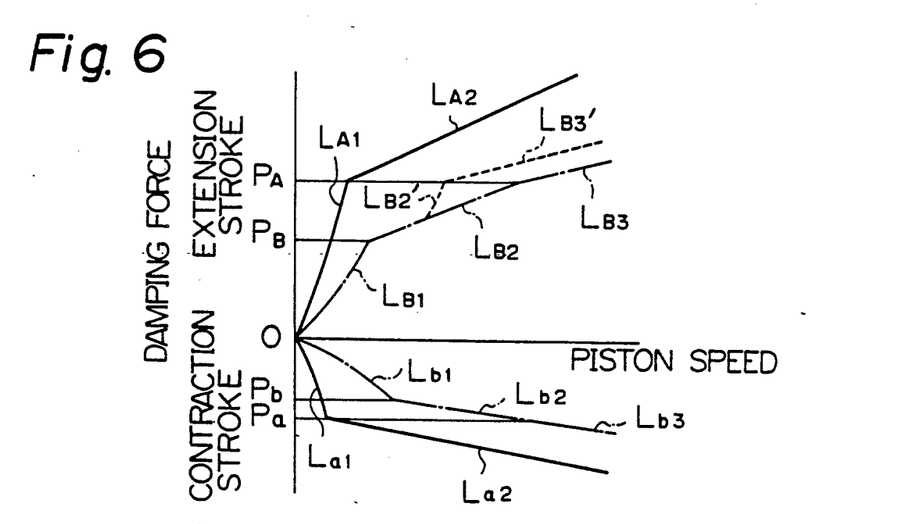
FIG. 6 is a graph showing the damping force characteristics of the hydraulic damper of the adjustable damping force type according to the first embodiment of the present invention.

When the opertional speed of the piston 2 increases and the differential pressures become respectively higher than $P_A$ and $P_a$, the disc valves 13 and 14 are opened to generate damping forces in the extension and contraction strokes, respectively, which have the linear characteristics indicated by the lines $L_{A2}$ and $L_{a2}$ in FIG. 6.

When the bore 17 is opened by the shutter 18 upon rotation of the operating rod 19, since the hydraulic fluid flows through the bypass passage 22, damping force will be generated by the first damping force generation valve 16, the second damping force generation valve 32 and the respective orifices 40 and 41 of the valve mechanism 35.

In this case, when the operational speed of the piston 2 is slow and the differential pressures are respectively lower than $P_B$ and $P_b$, damping force will only be generated by the fixed orifice 15 and the orifices 40 and 41 formed in the valve mechanism 35. More specifically, in the extension stroke of the piston, since the valve mechanism 35 is held closed, damping force will be generated by the orifice 41 formed in the valve body 39. In the contraction stroke of the piston, the valve mechanism 35 is opened and a damping force which is lower than the damping force in the extension stroke will be generated by the orifice 40 formed in the valve seat member 37, whereby orifice characteristics like the quadratic curve indicated by the lines $L_{B1}$, $L_{b1}$ in FIG. 6 may be obtained.

On the other hand, when the operating speed of the piston increases and the differential pressures become higher than $P_B$ and $P_b$, the disc valves 27 and 28 constituting the second damping force generation valve 32 are respectively opened in the extension and contraction strokes, whereby the linear damping force characteristics indicated by the lines $L_{B2}$ and $L_{b2}$ in FIG. 6 may be obtained.

When the operating speed of the piston 2 further increases and the differential pressures become higher than $P_A$ and $P_a$, the disc valves 13 and 14 of the first damping force generation valve 16 are respectively opened and composite damping force characteristics provided by the first and second damping force generation valves 16 and 32 will be obtained, as indicated by the lines $L_{B3}$ and $L_{b3}$ in FIG. 6.

It is to be noted that, in the first embodiment of the present invention, a cutout-like orifice may be provided in either of the disc valves 27 and 28 of the second damping force generation valve 32 in place of the orifice 41 formed in the valve mechanism 35, and the same orifice characteristics may still be attained.

The steps of assembly for the damper with the constitution described above will next be explained.

Firstly, the coil spring 38, the valve seat member 37 and the valve body 39 are inserted in the bore 34 of the tightening member 31, and the peripheral edge of the opening of the tightening member 31 is bent inwardly to secure the valve seat member 37 therein, thereby constituting the valve mechanism 35. Then the disc valves 27 and 28 are placed on the opposite sides of the annular member 23, and the stud 29 is fitted through the annular member 23. The tightening member 31 is screwed onto the stud 29, so that the disc valves 27 and 28 may be held against the annular member 23. Then the annular member 23 is inserted into the cylindrical member 7 to which the piston 26 is attached, and the stop member 24 is screwed into the cylindrical member 7 to fixedly mount the annular member 23 to the cylindrical member 7. This completes the assembly.

Figure 2:
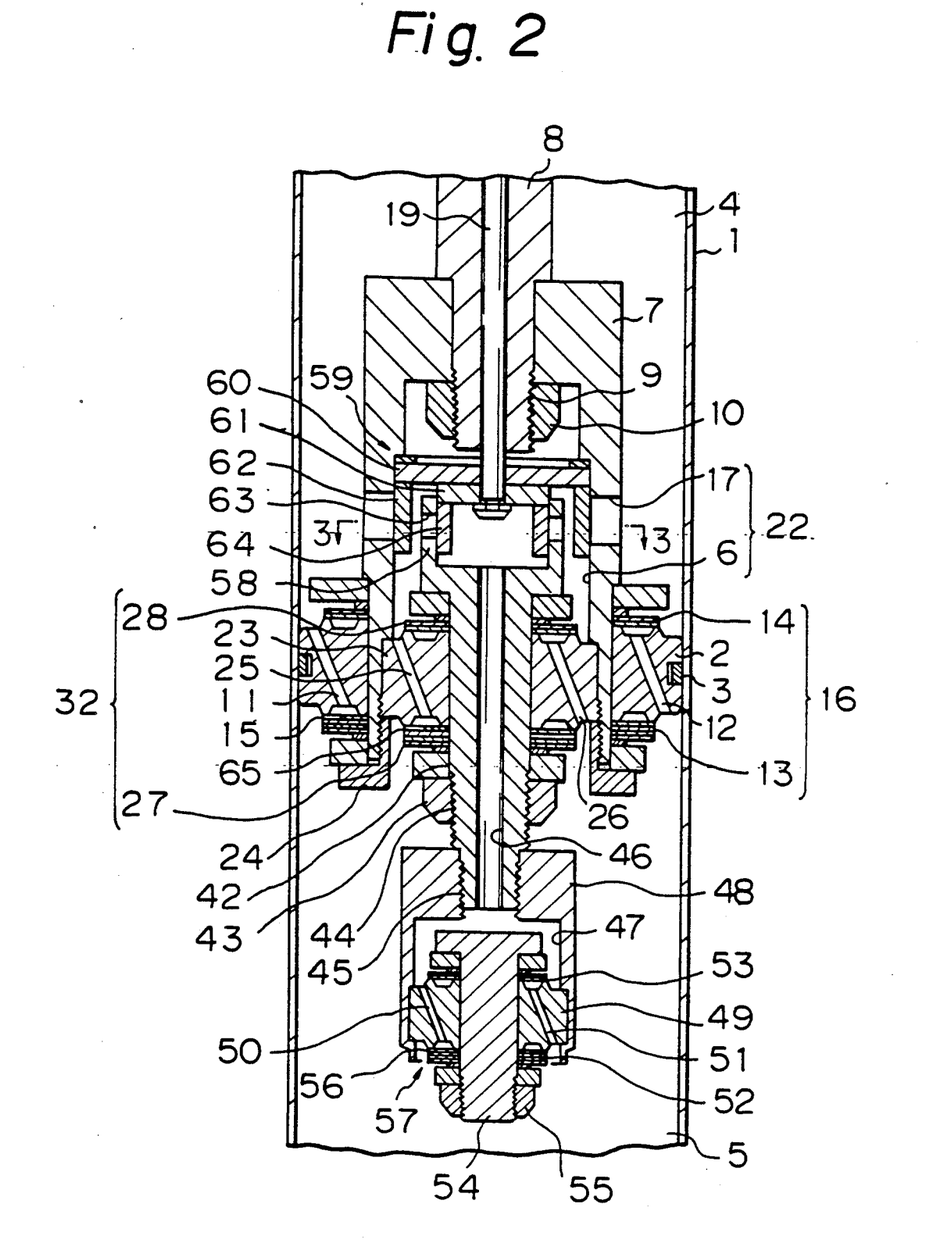
FIG. 2 is a sectional view of the essential part of a hydraulic damper of the adjustable damping force type according to a second embodiment of the present invention.

Next, the second embodiment of the present invention will be explained by referring to FIG. 2 and FIG. 3. Parts which are the same as or equivalent to those used in the first embodiment are denoted by the same reference numerals and detailed explanation thereof is omitted here.

At one end (at the lower part of FIG. 2) of a stud 42 are formed a threaded portion 44 to which a tightening member 43 is screwed and another threaded portion 45 which has a diameter smaller than that of the first threaded portion 44. To the latter threaded portion 45 is screwed a second cylindrical member 48 having a bore 47 which provides communication between a through-hole 46 of the stud 42 and the lower cylinder chamber 5. A second annular member 49 is secured in the bore 47 of the second cylindrical member 48 by bending inwardly the peripheral edge of the opening of the second cylindrical member 48.

In the second annular member 49 are formed extension side and contraction side passages 50 and 51, respectively. On the opposite sides of the second annular member are disposed disc valves 52 and 53, respectively (which constitute a third damping force generation valve). These disc valves are fixedly mounted to the second annular member 49 by means of a second stud 54 inserted into the second annular member 49 and a nut 55.

Whenever the through-bore 46 and an upper cylinder chamber 4 are in communication with each other, the disc valve 52 of one part is caused to open in the extension stroke of the piston if the pressure in the upper cylinder chamber 4 is higher than the pressure in the lower cylinder chamber 5 to allow the hydraulic fluid to flow from the upper cylinder chamber 4 to the lower cylinder chamber 5 through the extension side passage 50. On the other hand, the disc valve 53 of the other part is caused to open in the contraction stroke of the piston when the pressure in the lower cylinder chamber 5 is higher than the pressure in the upper cylinder chamber 4, thereby allowing the hydraulic fluid to flow from the lower cylinder chamber 5 to the upper cylinder chamber 4 through the contraction side passage 51.

The disc valve 52 of the other part is set to open when the differential pressure becomes higher than $P_D$, while the disc valve 53 of the other part is set to open at the differential pressure of $P_d$, which is lower than $P_D$. A fixed cutout orifice 56 is formed in the disc valve 52 of the one part. The second annular member 49, the respective passages 50 and 51 and the disc valves 52 and 53 constitute a valve mechanism 57.

It is to be understood that the respective disc valves 52 and 53 of the valve mechanism 57 are set to open at pressure differentials which are lower than the pressure differentials that cause respective disc valves 27 and 28 of the second damping force generation valve 32 to be opened ($P_B > P_D$, $P_b > P_d$).

The other end portion (at the upper part of FIG. 2) of the stud 42 is formed to provide an annular part 58 which constitutes a part of a shutter 59, as will be next explained.

The constitution of the shutter 59 is here explained. On one end portion of an operating rod 19, which extends axially of a piston rod 8, are integrally fixed a pair of rotary members 60 and 61 having different diameters. To the rotary member 60 having the larger diameter is fixed first closure members 62 formed in a section extending along the inner circumference of a cylindrical member 7 and adapted to close from the inside bores 17 formed in the cylindrical member 7. To the rotary member 61 of smaller diameter is fixed second closure members 64 formed in a sector extending along the inner circumference of the annular part 58 and adapted to close from the inside bores 63 formed in the annular part 58.

Figure 3A:
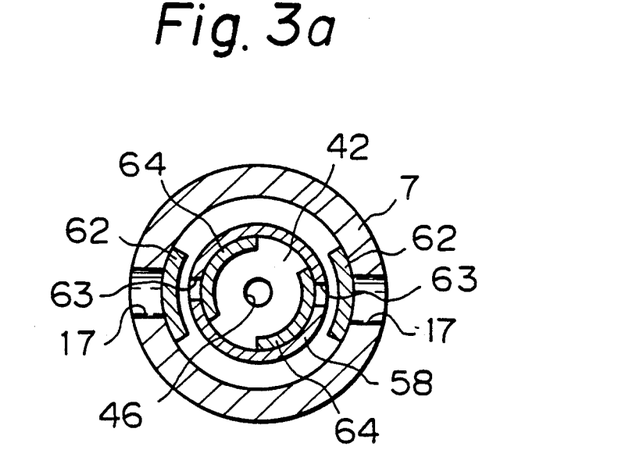
FIGS. 3(a), (b) and (c) are sectional views, respectively, taken along line III—III in FIG. 2, illustrating the successive steps of switching the shutter.
Figure 3B:
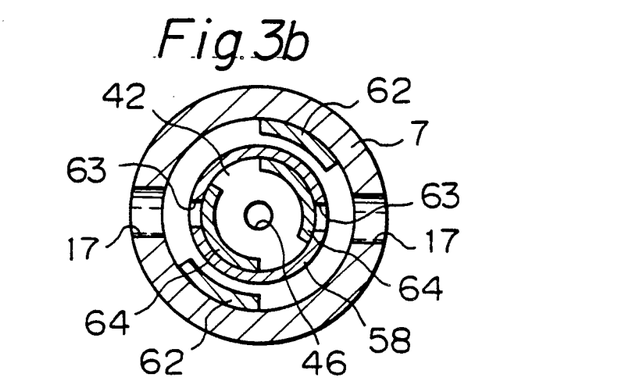
Figure 3C:
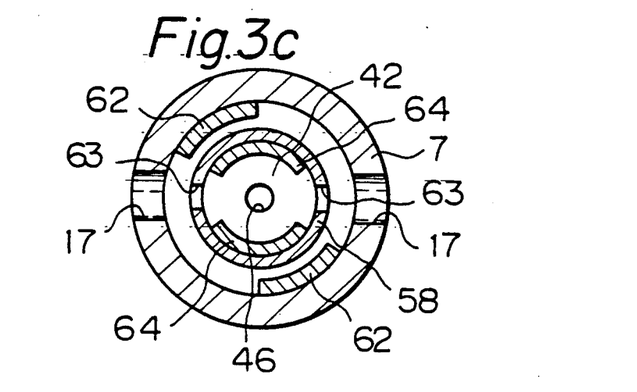

Thus, the first closure members 62 and the second closure members 64 are arranged to assume three positions as shown in FIGS. 3(a), (b) and (c), i.e. a first condition in which the first closure members 62 close the bores 17 of the cylindrical member 7 and at the same time, the second closure members 64 close the bores 63 of the annular member 58 [as shown in FIG. 3(a)]; a second condition in which the first closure members 62 open the bores 17 of the cylindrical member 7 and the second closure members 64 close the bores 63 of the annular member 58 [as shown in FIG. 3(b)]; and a third condition in which both the first closure members 62 and the second closure members 64 open the respective bores 17 and 63 [as shown in FIG. 3(c)].

In this second embodiment, a fixed orifice 65 is formed in the disc valve 27 of one part of the second damping force generating valve.

Operation of the hydraulic damper of adjustable damping force type according to the second embodiment which is constituted as above will now be explained.

In the condition shown in FIG. 3(a) in which both the bores 17 of the cylindrical member 7 and the bores 63 of the annular member 58 are closed by the shutter 59 upon rotation of the operating rod 19, since no hydraulic fluid flows through the bypass passage 22, damping force will only be generated by the first damping force generation valve 16. In this case, the damping force characteristics indicated by the lines $L_{A1}$-$L_{A2}$, $L_{a1}$-$L_{a2}$ in FIG. 7 will be obtained.

In the condition shown in FIG. 3(b) in which only the bores 17 of the cylindrical member 7 are opened by the shutter 59 upon rotation of the operating rod 19, since the hydraulic fluid flows between the cylindrical member 7 and the annular member 58, the damping force will be generated by the first damping force generation valve 16 and the second damping force generation valve 32. In this case, the damping force characteristics indicated by the lines $L_{B1}$-$L_{B2}$-$L_{B3}$, and $L_{b1}$-$L_{b2}$-$L_{b3}$ will be obtained, as explained with regard to the first embodiment. It is to be noted in regard to these damping force characteristics that the orifice characteristic is obtained by the fixed orifice 65 provided in the disc valve 27 of one part of the second damping force generation valve 32 and the same characteristic may be obtained for the extension stroke and the contraction stroke.

In the condition shown in FIG. 3(c) in which both the bores 17 of the cylindrical member 7 and the bores 63 of the annular member 58 are opened upon further rotation of the operating rod 19, since the hydraulic fluid flows between the cylindrical member 7 and the annular member 58 as well as internally within the annular member 58, damping force will be generated by the first damping force generation valve 16, the second damping force generation valve 32 and the valve mechanism 57.

Figure 7:
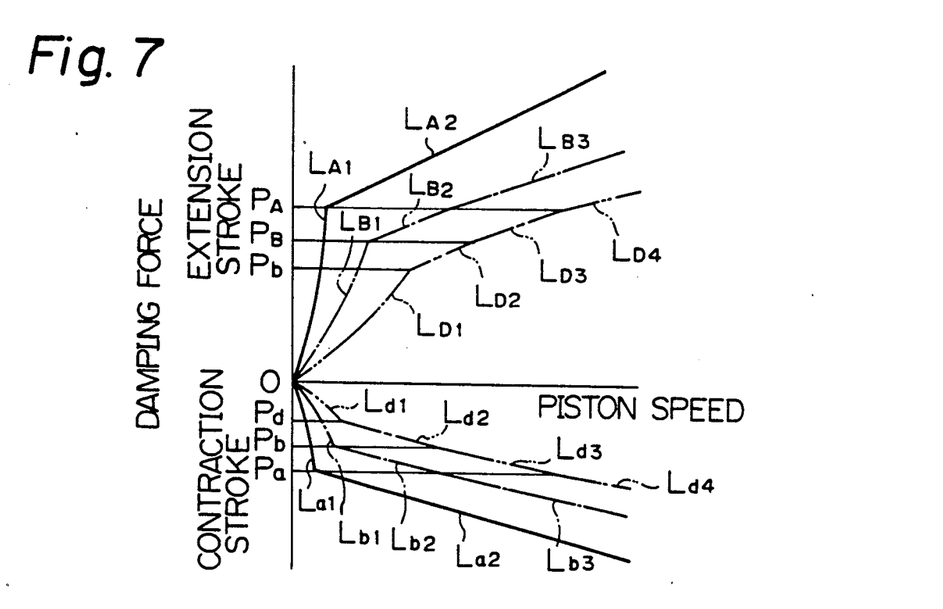
FIG. 7 is a graph showing the damping force characteristics of the hydraulic damper of the adjustable damping force type according to the second and third embodiments of the present invention.

In this case, when the operating speed of the piston 2 is slow and the differential pressures are respectively lower than $P_D$ and $P_d$, orifice characteristics like the quadratic curve indicated by the lines $L_{D1}$, $L_{d1}$ in FIG. 7 will be obtained. When the operating speed of the piston increases and the differential pressures respectively become higher than $P_D$ and $P_d$, the disc valves 52, 53 are opened and the linear characteristics indicated by the lines $L_{D2}$, $L_{d2}$ in FIG. 7 will be obtained.

Further, when the differential pressures respectively become higher than $P_B$ and $P_b$, the disc valves 27, 28 of the second damping force generation valve 32 are opened and the linear characteristics indicated by the lines $L_{D3}$ and $L_{d3}$ in FIG. 7 will be obtained.

When the operating speed of the piston 2 further increases and the differential pressure respectively become higher than $P_A$ and $P_a$, the disc valves 13, 14 of the first damping force generation valve 16 are also opened, and the composite damping force characteristics provided by the first damping force generation valve 16, the second damping force generation valve 32 and the valve mechanism 57 will be obtained, as indicated by the lines $L_{D4}$ and $L_{d4}$.

The steps of assembly for the second embodiment having the above constitution will next be explained.

Firstly, the second annular member 49, having the disc valves 52 and 53 secured on the opposite sides thereof by means of the second stud 54 and the nut 55, is attached onto the second cylindrical member 48. In the mean time, the disc valves 27 and 28 are placed on the opposite side of the annular member 23, and after inserting the stud 42 into the annular member 23 and screwing the tightening member 43 onto the stud 42, the disc valves 27 and 28 are carried by the annular member 23. Then the annular member 23 with the disc valves secured thereon is fitted into the cylindrical member 7 to which the piston 2 has been attached, and the annular member 23 is secured in the cylindrical member 7 by screwing the stop member 24. Finally assembly is completed by screwing the second cylindrical member 48 onto the threaded portion 45 at the end of the stud 42.

Figure 4:
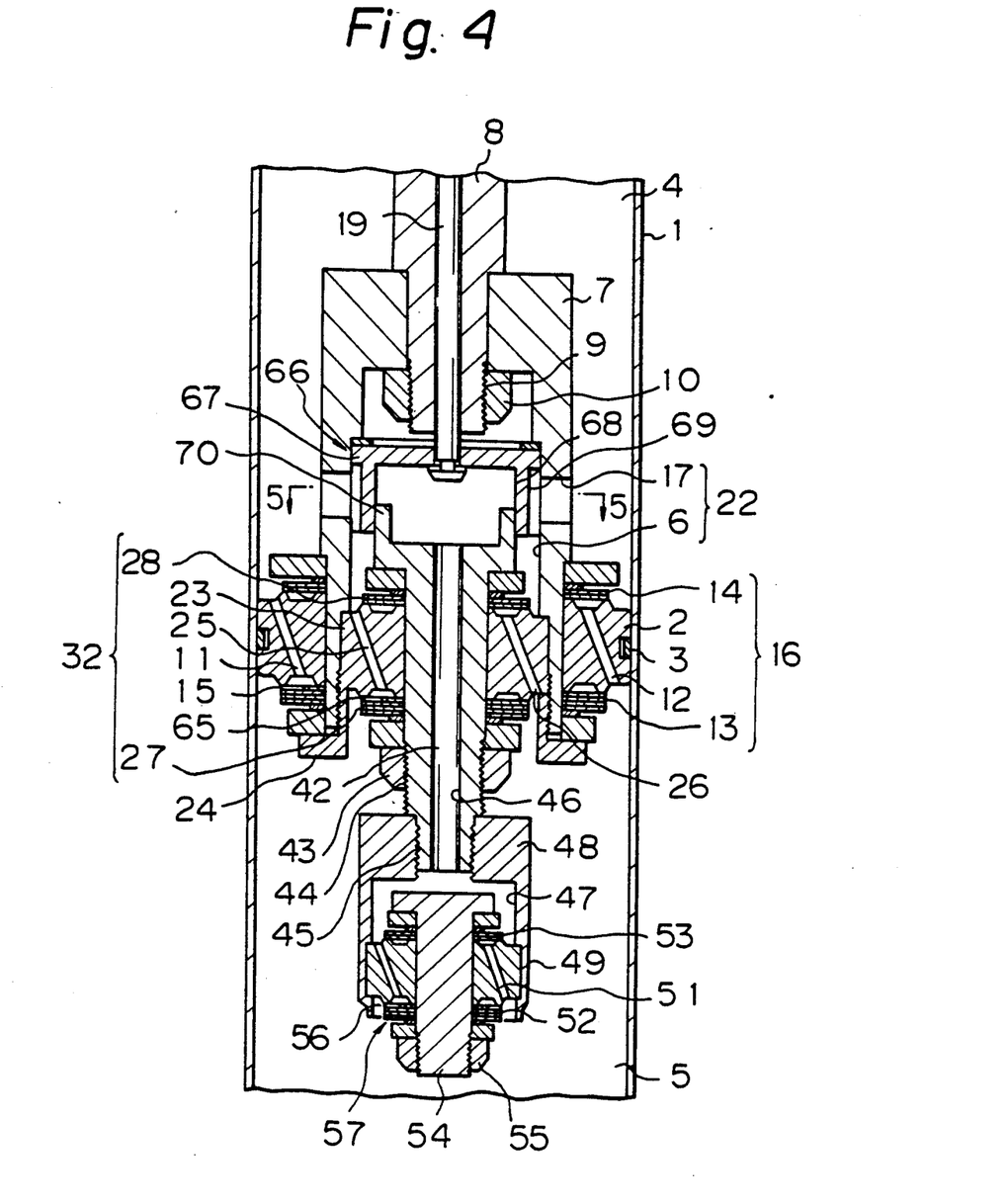
FIG. 4 is a sectional view of the essential part of hydraulic damper of the adjustable damping force type according to a third embodiment of the present invention.

An explanation will now be given of a third embodiment of the present invention by referring to FIG. 4 and FIG. 5. The third embodiment is different from the second embodiment only in terms of the construction of the shutter. Thus parts other than the shutter are denoted by the same numerals and detailed explanation thereof is omitted.

A shutter 66 comprises a rotary member 67 secured to one end of the operating rod 19 provided axially of a piston rod 8 and closure members 68 which are formed in a sector integrally with the rotary member 67. These closure members 68 are formed around inner circumference of a cylindrical member 7 such as to close bores 17 formed in the cylindrical member 7. At a part of the outer circumference of the closure members 68 are formed communication grooves 69 adapted to communicate the bore 17 with the space defined between the cylindrical member 7 and the stud 42. An annular part 70 of the stud 42 is fitted into the inner circumference of the closure member 68 relatively tightly.

Figure 5A:
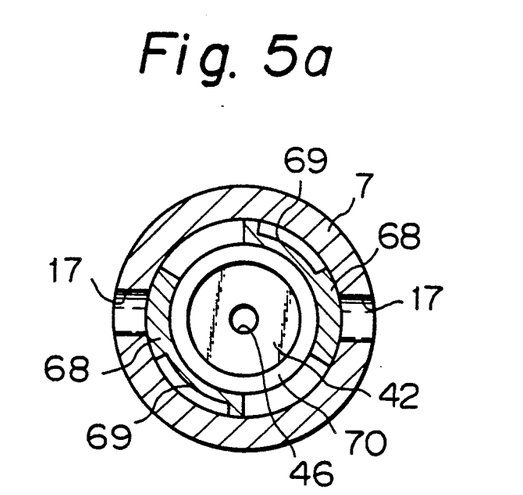
FIGS. 5(a), (b) and (c) are sectional views, respectively, taken along line V—V in FIG. 4 illustrating the successive steps of switching the shutter.
Figure 5B:
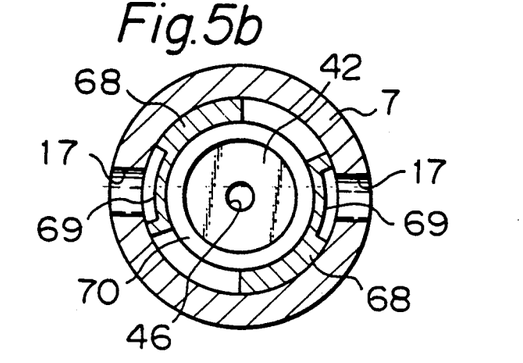
Figure 5C:
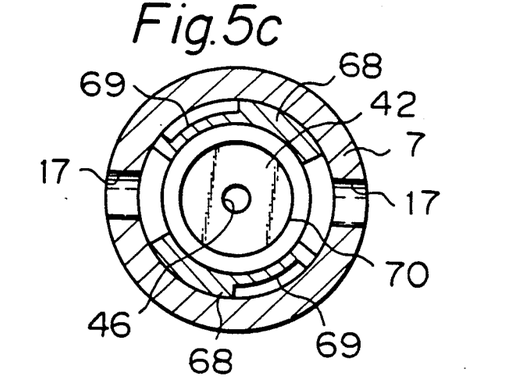

In this arrangement, rotation of the rotary member 67 provides three different conditions, i.e., a first condition as shown in FIG. 5(a) wherein the bore 17 of the cylindrical member 7 is closed, a second condition as shown in FIG. 5(b) wherein the space defined between the cylindrical member 7 and the stud 42 is in communication with the bore 17 by way of the communication groove 69, and a third condition as shown in FIG. 5(c) wherein the space defined between the cylindrical member 7 and the stud 42 as well as the through-bores 46 of the stud 42 and the bore 17 are all in communication with each other.

It is to be understood that the operation of the third embodiment of the present invention is identical to that of the second embodiment. Namely, the condition shown in FIG. 5(a) corresponds to that of FIG. 3(a), the condition shown in FIG. 5(b) corresponds to that of FIG. 3(b), and the condition shown in FIG. 5(c) correspond to that of FIG. 3(c). The steps of assembly are also identical to those with the second embodiment.

In the second and third embodiments, the valve mechanism 57 comprising the second cylindrical member 48, the second annular member 49, the disc valves 52 and 53, the second stud 54 and the nut 55 may be simply screwed onto the stud 42, so mounting and dismounting are easy. From this point of view, if various valve mechanism 57 having different characteristics are prepared in advance, many sorts of hydraulic dampers may be provided having different damping force characteristics in the slow operating speed range of the piston by suitably selecting different types.

It is also possible in the first embodiment for more than two kinds of damping force characteristics to be obtained by providing the shutters 59 and 66 having the constitution exhibited in the second and third embodiment in place of the shutter 18.

It is also possible for the tightening member 43 and the second cylindrical member 48, which are constituted as separate members in the second and third embodiments, to be made in an integral form of construction, as in the first embodiment, thus reducing the number of components and the axial length of the apparatus.

Although the shutters 59 and 66 in the second and third embodiments are switched between a condition in which only the first damping force generation valve 16 is operative, a condition in which the first and second damping force generation valves 16 and 32 are operative, and a condition in which the first, second and third damping force generation valves 16, 32 and 57 are all operative, it is also possible for them to be switched between a condition in which the first damping force generation valve 16 and the second damping force generation valve 32 are operative and a condition in which the first damping force generation valve 16 and the third damping force generation valve 57 are operative.

Figure 8A:
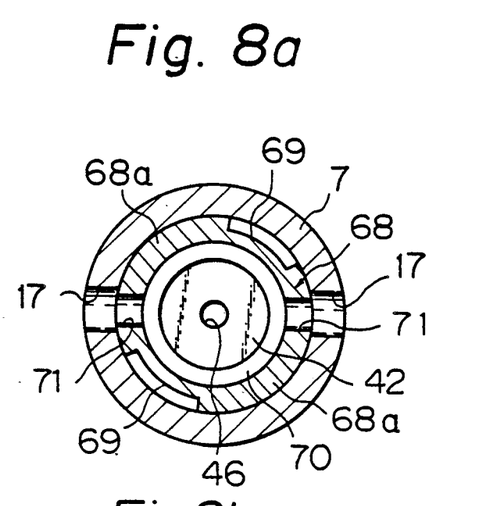
FIGS. 8(a), (b) and (c) show the successive steps of switching the shutter, which is a modified version of that of the third embodiment.
Figure 8B:
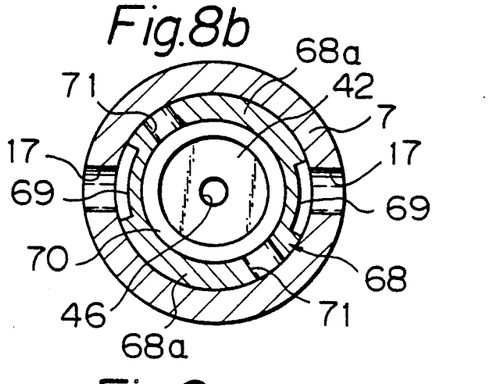
Figure 8C:
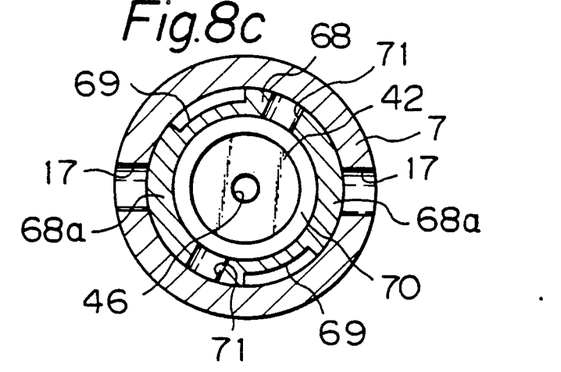

This alternative approach is attainable with respect to the shutter 66 according to the third embodiment by, for example, forming the closure member 68 in the shape of an annulus ring as shown in FIG. 8, rather than as a sector. Such an annulus ring-shaped portion of the closure member 68 is divided into a portion 68a adapted to close the bores 17, a portion in which the communication grooves 69 are formed and a portion in which through-holes 71 which solely provide communication between the bores 17 and the through-hole 46 of the stud 42 are formed (the through-hole 71 not being in communication with the space defined between the cylindrical member 7 and the stud 42). Upon rotation of the shutter 66, the first damping force generation valve 16 and the second damping force generation valve 32 are brought into communication [the condition shown in FIG. 8(b)], or alternatively the first damping force generation valve 16 and the third damping force generation valve 57 are brought into communication with each other [the condition shown in FIG. 8(a)].

In the first, second and third embodiments, the shutters 18, 59 and 66 are designed to open or close the bores 17 so as to control the flow passage area. Alternatively, however, a plurality of small perforations of different sizes may be provided in the shutter, as publicly known in the prior art. In this case, the shutters are rotated to selectively bring one of these perforations into alignment with the bore 17, whereby the damping force may be adjusted by the combination of the perforations, the second damping force generation valve 32, and the valve mechanism 35 and 36.

It is to be noted in this case that when the selected perforation has a flow passage area which is smaller than the orifice 41 and fixed orifices 56 and 65, damping force characteristics solely created by the small perforations are provided, as in the prior art, but when the selected perforations have a flow passage area which is somewhat larger than the orifice 41, for example, two-step orifice characteristics as indicated by the lines $L_{B2'}$-$L_{B3'}$ may be obtained.

As explained above, the present invention is constructed with the valve mechanism disposed on the stud such as to secure the second damping force generation valve and as a result, the valve mechanism does not need to be provided in the shutter. This makes assembly work extremely easy. Thus productivity may be enhanced and production costs reduced.

Furthermore, by suitably combining the first, second and third damping force generation valves by means of the shutter, various kinds of damping force characteristics may be provided and, therefore, the hydraulic damper may be adjusted to provide optimum damping force characteristics in accordance with the condition of the road over which the automobile is running.

This allows for an improved ride and better vehicle maneuverability.

Figure 9:
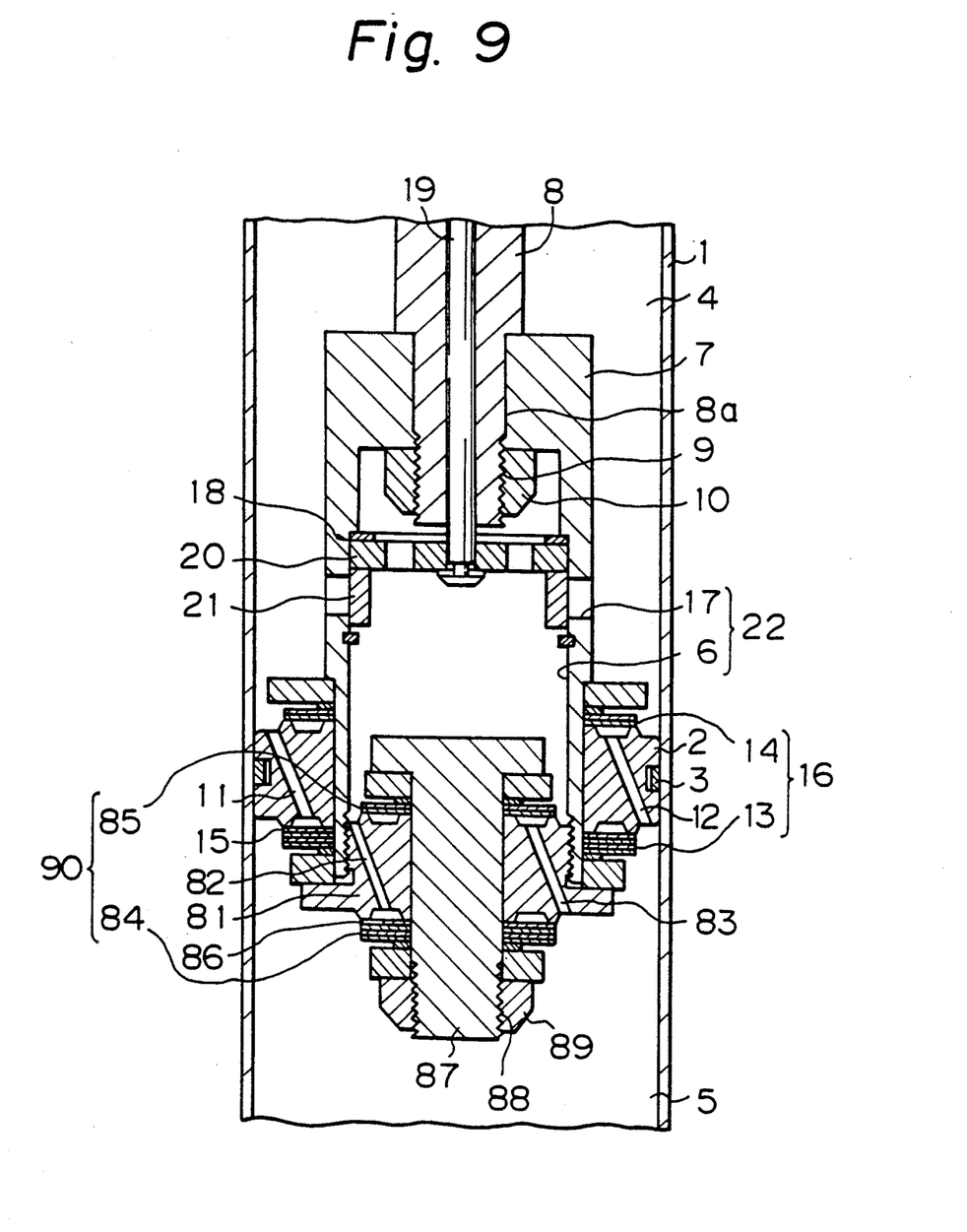
FIG. 9 is a sectional view of a fourth embodiment of the present invention.

Referring now to FIG. 9, a fourth embodiment of the present invention will be explained. The same reference numerals will be used to designate elements which are the same as those in the first embodiment, and explanation thereof will therefore be omitted.

As clearly seen in the figure, a cylindrical member 7 is secured to a piston rod 8 in the same manner as in the first embodiment and is formed with an outer diameter substantially larger than that of the piston rod 8. The inner diameter of a stepped bore 6 of the cylindrical member 7 is also made larger than the outer diameter of a portion 8a of the piston rod 8 on which the cylindrical member 7 is mounted, so that the area of a bypass passage 22 is substantially large.

An extension side disc valve 13 of a first damping force generating valve 16 is designed to open when there is a pressure differential $P_A$ between upper and lower chambers 4 and 5, while a contraction side disc valve 14 of the first damping force generating valve 16 is designed to open with a pressure differential $P_a$ which is lower than $P_A$. A fixed orifice 15 is also provided in the disc valve 13.

A valve mechanism is disposed in the bypass passage 22. This valve mechanism comprises an annular member 81 threadedly secured onto the inner circumference of the cylindrical member 7, a second passage consisting of a second extension side and contraction side passages 82 and 83, both formed in the annular member 81 and communicating with the opposite sides of the member 81, and disc valves 84 and 85 respectively mounted on the opposite sides of the annular member 81 and designed to open at respective pressure differentials $P_B$ and $P_b$, the latter being lower than $P_B$. A fixed orifice 86 is formed in the extension side disc valve 84.

These disc valves 84 and 85 are respectively secured to the opposite sides of the annular member 81 by means of a stud 87 coaxially inserted through the annular member 81 and a nut 89 screwed onto a threaded portion 88 of the stud 87. These valves 84 and 85 together constitute a second damping force generation valve 90. The disc valves 84 and 85 of the second damping force generation valve 90 are designed to open at pressure differentials which are respectively lower than those for the disc valves 13 and 14 of the first damping force generation valve 16 ($P_A > P_B$, $P_a > P_b$).

In a case where the openings 17 are closed by a shutter 18, hydraulic fluid does not flow through the bypass passage 22 and thus damping force is generated solely by the first damping force generation valve 16. When the speed of a piston 2 is relatively slow and the pressure differences generated in the extension and contraction side strokes are respectively lower than $P_A$ and $P_a$, the disc valves 13 and 14 of the first damping force generation valve 16 do not open and the fixed orifice 15 alone generates damping force, the orifice characteristics of which are as indicated by the quadratic lines $L_{A1}$ and $L_{a1}$ shown in FIG. 10. When the speed of the piston 2 becomes faster, the valves 13 and 14 open in the extension and contraction side strokes, respectively, the damping force characteristics then being such as those indicated by lines $L_{A2}$ and $L_{a2}$ shown in FIG. 10.

In a case where the openings 17 are opened by the shutter 18, hydraulic fluid also flows through the bypass passage 22 and damping force is generated by means of the first and second damping force generation valves 16 and 90.

When the speed of the piston 2 is low and the pressure differentials generated in the extension and contraction strokes are respectively lower than $P_B$ and $P_b$, damping force is generated by the fixed orifices 15 and 86 respectively formed in the disc valve 13 and 84 together. The damping force characteristics then obtained are such as those indicated by quadratic lines $L_{B1}$ and $L_{b1}$ shown in FIG. 10.

Figure 10:
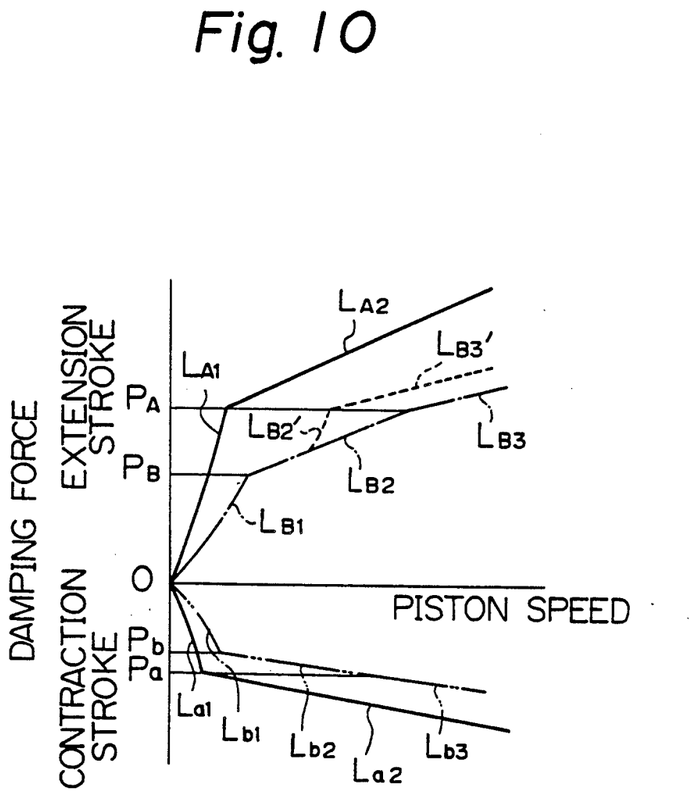
FIG. 10 is a graph showing the damping force characteristics of the hydraulic damper according to the fourth embodiment.

When the speed of the piston 2 becomes faster and the pressure differentials generated in the extension and contraction side strokes are respectively higher than $P_B$ and $P_b$, the disc valves 84 and 85 of the second damping force generation valve 90 are respectively opened and the damping force characteristics obtained are as indicated by lines $L_{B2}$ and $L_{b2}$ shown in FIG. 10.

When the speed of the piston 2 becomes even faster and the pressure differentials respectively become higher than $P_A$ and $P_a$, the disc valves 13 and 14 of the first damping force generation valve 16 are also opened, so that the first and second damping force generation valves 16 and 90 together generate complex damping force characteristics as indicated by lines $L_{B3}$ and $L_{b3}$ shown in FIG. 10.

As explained above, in a hydraulic damper according to the present invention, a bypass passage providing communication between two chambers defined in the cylinder is formed by a cylindrical member having a diameter larger than that of the piston rod. The inner diameter of the cylindrical member can therefore be made substantially large, and the bypass passage causes no resistance to the oil flowing therethrough, unlike the conventional case in which a bypass passage is defined by a through bore formed in the piston rod.

It will be apparent to those skilled in the art that many changes can be made to the hydraulic damper of adjustable damping force type according to the present invention described above without departing from the spirit and scope of the present invention. Thus the scope of the present invention should not be limited to the examples described in this application but only by the condition described by the claims and equivalents thereof.

What is claimed is:

1. A hydraulic damper of the adjustable damping force type, comprising:
   a cylinder;
   a piston-piston rod assembly disposed in said cylinder including a piston and a piston rod connected to said piston at its one end, said piston being slidably disposed in said cylinder and dividing the interior of said cylinder into two cylinder chambers;
   a first passage formed through said piston for providing communication between said two cylinder chambers;
   a first damping force generation valve provided on said piston for generating a damping force in extension and contraction strokes of said damper;
   a bypass passage in said piston-piston rod assembly communicating said two cylinder chambers;
   an annular member having opposite sides fitted into said bypass passage, said annular member having a second passage communicating said opposite sides thereof;
   a second damping force generation valve secured to said opposite sides of said annular member by means of a stud inserted through said annular member and a tightening member mounted on said stud, said second damping force generation valve being adapted to generate a damping force in the extension and contraction stroke of said damper;
   a through-hole extending axially through said stud;
   a third damping force generation valve on said stud for controlling flow of the hydraulic fluid through said through-hole;
   a shutter means in said bypass passage for controlling the flow passage area of said bypass passage, wherein said shutter means is so constructed that a passage route including said second damping force generation valve and a passage route including said third damping force generation valve in said bypass passage are selectively switched by said shutter means to control the flow passage area in said bypass passage; and
   wherein said third damping force generation valve is adapted to generate damping force in the extension and contraction strokes of said damper.

2. The hydraulic damper as claimed in claim 1, wherein:
   a tubular member is secured to said one end of said piston rod inserted into said cylinder, the outer diameter of said tubular member being larger than the outer diameter of said piston rod;
   an opening is formed through said tubular member;
   an operating rod is inserted through said piston rod for the purpose of operating said shutter means;
   said piston is fixedly secured to the outer periphery of said tubular member such as to partition the interior of said cylinder; and
   said bypass passage communicating said two chambers comprises the interior of said tubular member and an opening formed through said tubular member.

3. A hydraulic damper of the adjustable damping force type, comprising:
   a cylinder;
   a piston-piston rod assembly disposed in said cylinder including a piston and a piston rod connected to said piston at its one end, said piston being slideably disposed in said cylinder and dividing the interior of said cylinder into two cylinder chambers;

a first passage formed through said piston for providing communication between said two cylinder chambers;

a first damping force generation valve provided on said piston for generating a damping force in extension and contraction strokes of said damper;

a bypass passage in said piston-piston rod assembly communicating said two cylinder chambers;

an annular member having opposite sides fitted into said bypass passage, said annular member having a second passage communicating said opposite sides thereof;

a second damping force generation valve secured to said opposite sides of said annular member by means of a stud inserted through said annular member and a tightening member mounted on said stud, said second damping force generation valve being adapted to generate a damping force in the extension and contraction stroke of said damper;

a through-hole extending axially through said stud;

a third damping force generation valve on said stud for controlling flow of the hydraulic fluid through said through-hole;

a shutter means in said bypass passage for controlling the flow passage area of said bypass passage, wherein said shutter means is so constructed that a passage route including said second damping force generation valve and a passage route including said third damping force generation valve in said bypass passage are selectively switched by said shutter means to control the flow passage area in said bypass passage; and wherein said third damping force generation valve is adapted to generate the damping force in the extension stroke of said damper.

4. A hydraulic damper of adjustable damping force type as claimed in claim 3, wherein:

a tubular member is secured to said one end of said piston rod inserted into said cylinder, the outer diameter of said tubular member being larger than the outer diameter of said piston rod;

an opening is formed through said tubular member;

an operating rod is inserted through said piston rod for the purpose of operating said shutter means;

said piston is fixedly secured to the outer periphery of said tubular member such as to partition the interior of said cylinder; and said bypass passage communicating said two chambers comprises the interior of said tubular member and an opening formed through said tubular member.

* * * * *